United States Patent [19]

Toyama et al.

[11] 4,046,465
[45] Sept. 6, 1977

[54] SELF-TIMER DEVICE FOR MOTION PICTURE CAMERA

[75] Inventors: Masamichi Toyama; Tomoshi Takigawa, both of Machida; Mamoru Shimazaki, Tokyo; Hidekazu Okajima, Kawasaki; Toshikazu Ichiyanagi, Tokyo; Hideto Iwama, Kawasaki, all of Japan

[73] Assignee: Canon Kabushiki Kaisha, Tokyo, Japan

[21] Appl. No.: 624,340

[22] Filed: Oct. 21, 1975

[30] Foreign Application Priority Data

Oct. 24, 1974 Japan ............... 49-122803

[51] Int. Cl.² .............................................. G03B 1/00
[52] U.S. Cl. .................... 352/175; 354/238; 242/208
[58] Field of Search ............... 352/175; 354/237, 238, 354/239, 240; 242/208

[56] References Cited

U.S. PATENT DOCUMENTS

| 3,027,800 | 4/1962 | Leuschke | 352/175 |
| 3,567,316 | 3/1971 | Wilharm | 352/175 |
| 3,667,367 | 6/1972 | Miyagawa | 354/238 |

Primary Examiner—Monroe H. Hayes
Attorney, Agent, or Firm—Toren, McGeady and Stanger

[57] ABSTRACT

A self-timer device for a motion picture camera of the type having a first motor for driving a film feeding device and a shutter device and a second motor for driving other moving parts such as a zoom lens system. In the device, automatic photographing controlling means which is provided with cam portions for controlling the timing for starting and stopping the camera release operation is operated by the second motor. For photographing, an interlock arrangement between the second motor and the other moving parts which are to be driven by the motor is released while, at the same time, the cam portions of the controlling means are brought into a given relation to a camera release arrangement. This is done in such a manner that the timing for starting and stopping the camera release, i.e. the time intervals between setting for automatic photographing and the actual commencement of it and between the start of photographing and the end of it, is controlled by the cam portions of the controlling means as the controlling means is operated by the second motor to accomplish an automatic photographing operation.

15 Claims, 7 Drawing Figures

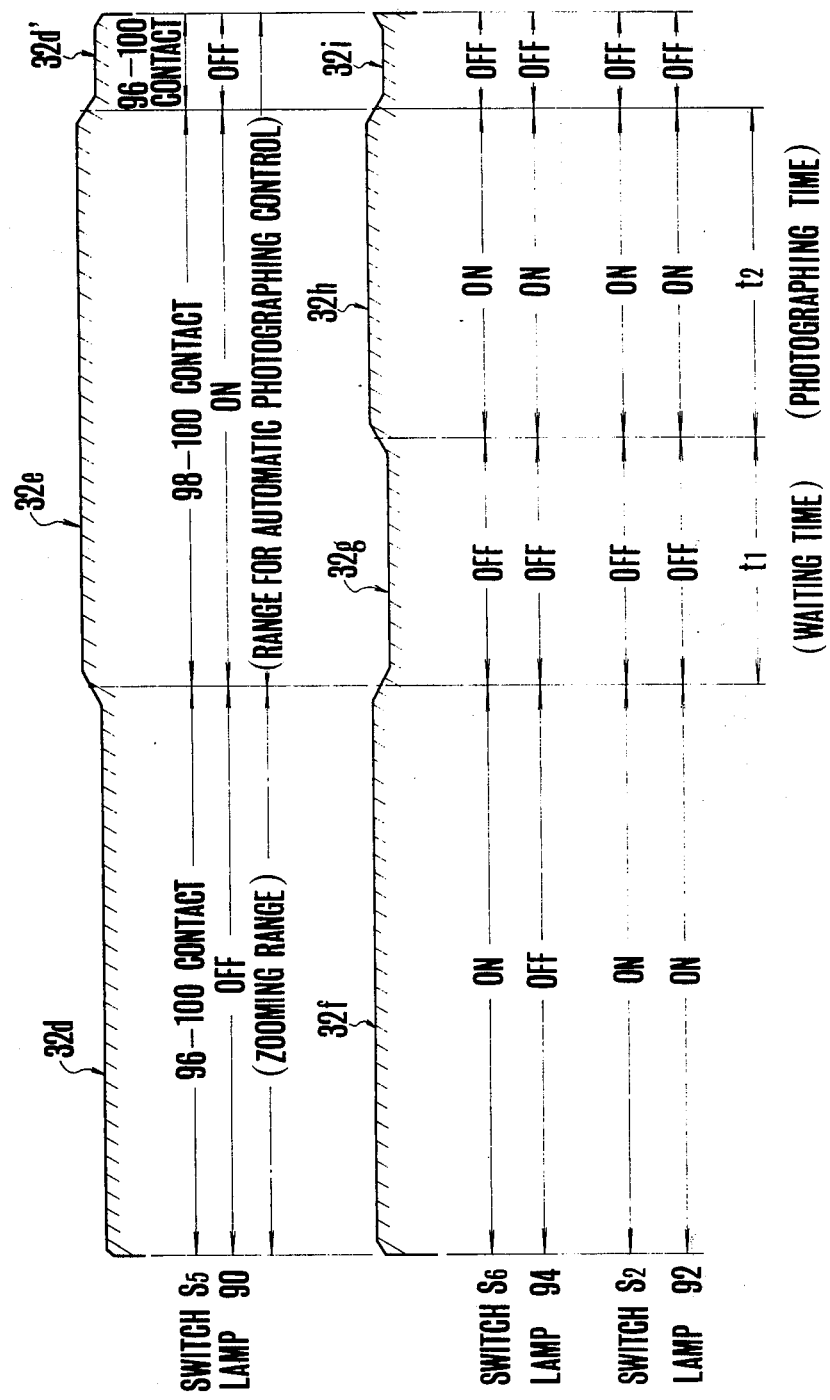

SELF-TIMER DEVICE FOR MOTION PICTURE CAMERA

BACKGROUND OF THE INVENTION

1. Field of the Invention

This invention relates to a self-timer device for a motion picture camera and, more particularly, to a self-timer device which is driven by an electric motor provided for driving certain moving parts of the camera and which controls the timing for starting and stopping the release of the camera, i.e. the time intervals between setting for an automatic photographing and the actual start of it and between the start of photographing and the end of it, to enable an automatic photographing operation while being driven by the electric motor.

2. Description of the Prior Art

For automatic photographing of a scene with a motion picture camera, a self-timer device for automatically stopping a release arrangement of the camera a preset period of time after the start of the camera release is known as disclosed, for example, by a Japanese patent publication No. Sho 42-16578.

In the device disclosed by the patent publication No. Sho 42-16578, there are provided a restricting member which restricts a shutter release member in its operating position when it is operated and a restriction removing member which works the restricting member to remove the above stated restriction. When the release member is operated to start a photographing operation, the release member is restricted in its operative position and, at the same time, the restriction removing member is shifted in response to a driving device of the camera in such a manner that the restriction on the shutter release member by the restricting member is removed to return the shutter release member to its inoperative position when a predetermined length of time has elasped so that the photographing operation can be automatically terminated.

One of the main purposes of a self-timer device for a motion picture camera is, as it is so with self-timers of still picture cameras, provide for the participation of the photographer himself in the scene being photographed. Using the self-timer device disclosed in the patent publication cited above, te photographer is allowed to participate only from the midst of the scene after he has operated the shutter release member. Such participation, then, tends to make the scene very unnatural.

To eliminate such inconvenience, there have been proposed and have been actually marketed other self-timers that permit controlling the time interval between setting for automatic photographing and the acutal start of it (will be called "waiting time" hereinafter) as well as another time interval between the start of photographing and the end of it (hereinafter will be called "photographing time").

In an example of such conventional self-timer devices, there is provided an electric timer circuit which can control both the waiting time and the photographing time; the output of the timer circuit is used to control the on-off timing of switching means which is connected to an electromagnetic release arrangement of the camera in such a way as to start photographing by actuating the release arrangement after the waiting time has elaspsed and to stop the operation of the release arrangement when the photographing time has elaspsed. There is also another example wherein a pure mechanical control arrangement is employed instead of such an electrical control arrangement. In the mechanical arrangement, a controlling member is driven by a spring member through a governor mechanism to control the timimg for starting and terminating the camera release for automatic photographing.

However, the former example of the prior art requires the use of a plurality of time constant arrangements for controlling different time intervals. This makes the circuit arrangement more complicated. On the other hand, in the latter example, the driving force obtainable from the spring member alone is not sufficient and the insufficient driving force tends to cause variation in the time intervals to be controlled thereby.

In view of these drawbacks of the conventional devices, the assignee of the present invention has previously proposed in U.S. Pat. application Ser. No. 595,008, filed July 11, 1975, a self-timer device which uses an electric timer circuit to control only the waiting time while the photographing time is controlled by utilizing the rotational frequency or rotating degree of a motor which drives a film feeding device and a shutter device of the camera.

However, even the device of Ser. No. 595,008 necessitates the use of an electric timer circuit for the purpose of controlling the waiting time. Generally a circuit of this type comprises electric elements such as capacitor, resistor, etc. and is vulnerable to a leakage current, variation in the ambient temperature, etc. The circuit therefore tends to cause variation in the controlled time intervals in automatic photographing operations.

SUMMARY OF THE INVENTION

It is, therefore, the principal object of the present invention to provide a self-timer device for a motion picture camera which eliminates these drawbacks of the various devices proposed in the past.

It is another object of this invention to provide a self-timer device which is driven by an electric driving device provided for driving certain operating componets of the camera and which thus serves to control the timing for starting and terminating the release of the camera or, in other words, a time interval between setting for an automatic photographing operation and start of actual photographing and another time interval between the start of photographing and the end of it to accomplish an automatic photographing operation.

It is still another object of this invention to provide a self-timer device which is suitable for a motion picture camera provided with a first motor which is provided for driving a film feeding device and a shutter device and a second motor which is used for driving other operating components of the camera such as a zoom lens system. Particularly, in a preferred mode of embodying this invention, the motor which is provided for driving a zoom lens system is utilized for driving also automatic photographing controlling means which includes cam portions. For photographing, the interlocking relation of the motor to the zoom lens system which is driven by the motor is removed. Concurrently with that, the cam portions are made to be interrelated to a camera release arrangement and is actuated by the motor to control the timing or starting and terminating the camera release, i.e. a time interval between setting for automatic photographing and the actual start thereof and another time interval between the start and the end of the automatic photographing operation.

The further objects, features and advantages of the present invention will be understood from the following detailed dselosure taken in conjunction with the accompanying sheets of drawings.

BRIEF DESCRIPTION OF THE DRAWINGS

The accompanying sheets of drawings illustrate a preferred embodiment of this invention.

FIG. 7 is a development view of the cam portions of the control member along with a timing chart useful in explaining the control accomplished by the cam portions.

DETAILED DESCRIPTION OF THE PREFERRED EMBODIMENT

Figure 1:
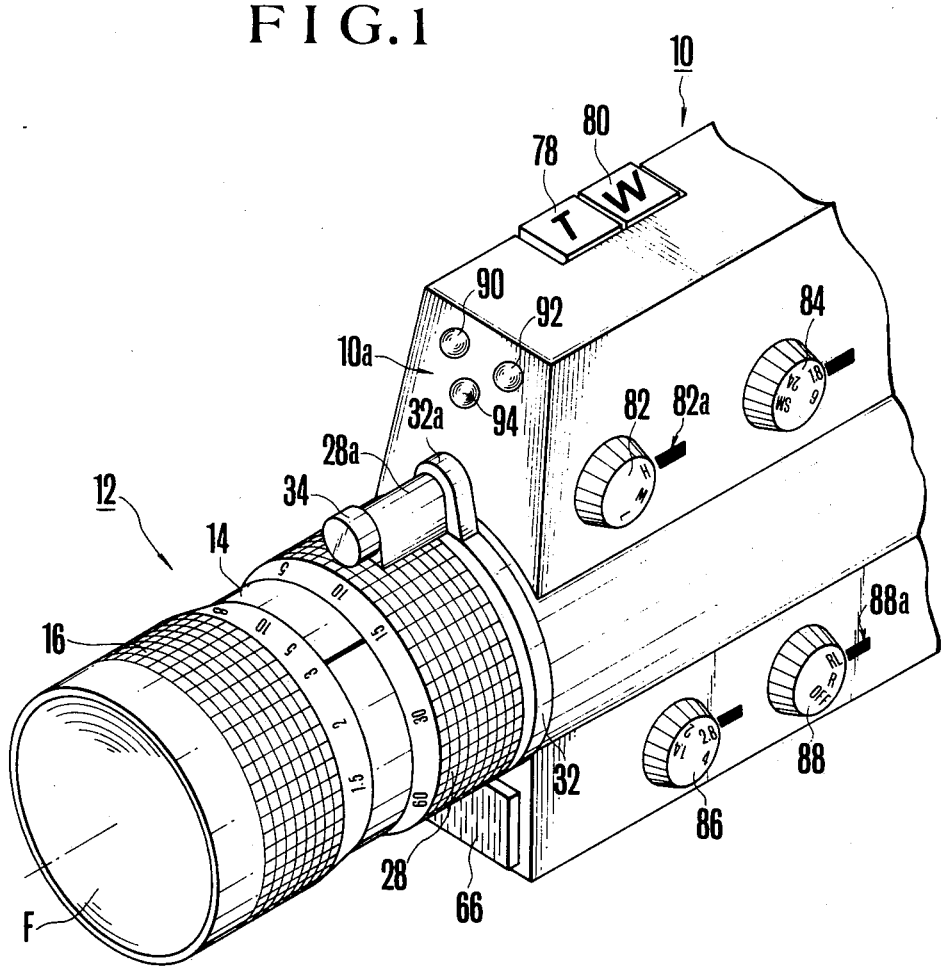
FIG. 1 is an oblique view illustrating the external view of an essential portion of a motion picture camera which is equipped with a self-timer device in accordance with this invention.
Figure 2:
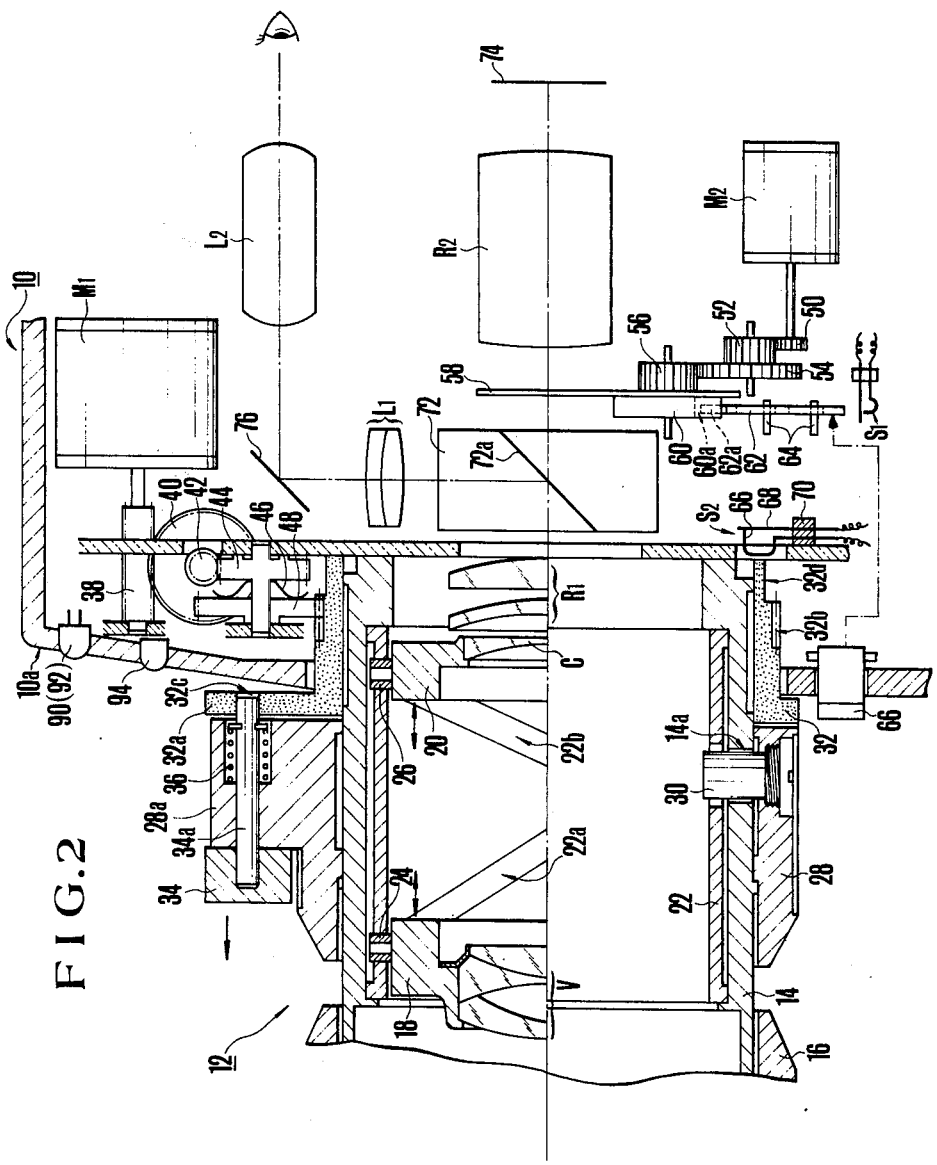
FIG. 2 is a sectional view illustrating the inside of the camera of FIG. 1 and is useful in explaining an essential portion related to this invention.

The structure of a motion picture camera which is equipped with a self-timer device in accordance with this invention as a preferred embodiment is as illustrated in FIGS. 1 and 2, wherein; the motion picture camera body 10 is provided with a zoom lens systen 12. Inside a fixed lens barrel 14 of the zoom lens system 12, there are provided a lens group F for focusing, a lens group V for variable magnification, a correction lens group C and a relay lens group $R_1$, a known zoom lens system thus being formed with these lens groups. The lens group F is coupled to a focusing operation ring 16 which is used for focusing by moving the lens group F along the optical axis of the lens system. The lens groups V and C are supported respectively by a lens carrying frames 18 and 20 to be also movable along the optical axis respectively.

A cam ring 22 is provided with cam slots 22a and 22b for restricting the movement of the lens groups V and C within a relation predetermined for zooming. Pins 24 and 26 which are connected to the lens carrying frames are inserted in the cam slots 22a and 22b respectively.

A zooming operation ring 28 is coupled to the cam ring 22 through a pin 30 which penetrates a slot 14a of the fixed lens barrel 14. When the ring 28 is operated, the cam ring 22 rotates and the lens groups V and C are moved through the cam slots 22a and 22b of the cam ring 22 in accordance with the relation predetermined for zooming, so that a desired zooming can be accomplished.

The reference numeral 32 indicates an automatic photographing control member which constitutes an essential part of the self-timer of this invention. As illustrated in detail in FIG. 4, the control member 32 is a cylindrical body which is arranged to be rotatable over the outer circumference of the fixed lens barrel 14. On the periphery of the control member 32 there are provided a protrudent arm 32a and a cogged portion 32b. A hole 32c is provided in the arm 32a. At the edge portion of the control member 32, there are provided cam portions 32d, 32d' and 32e which are used for controlling the switching action of a switch $S_5$ (FIG. 3) connected to the motor $M_1$ which is provided for driving the zoom system 12.

Other cam portions 32f, 32g, 32h and 32i which are also formed at the edge of the control member 32 are arranged to control the on-off operation of a switch $S_2$ (shown in FIG. 3) connected to the motor $M_2$ which drives the shutter device and the unillustrated film feeding device.

Figure 5:
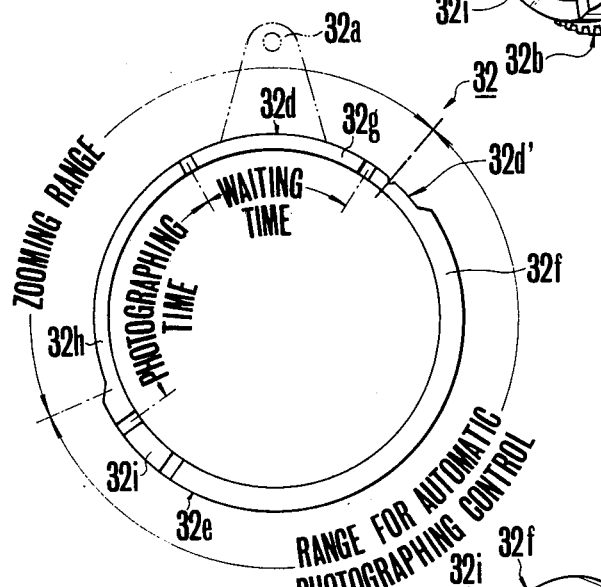
FIG. 5 is a schematic view of the cam portions of the above stated control member.
Figure 6:
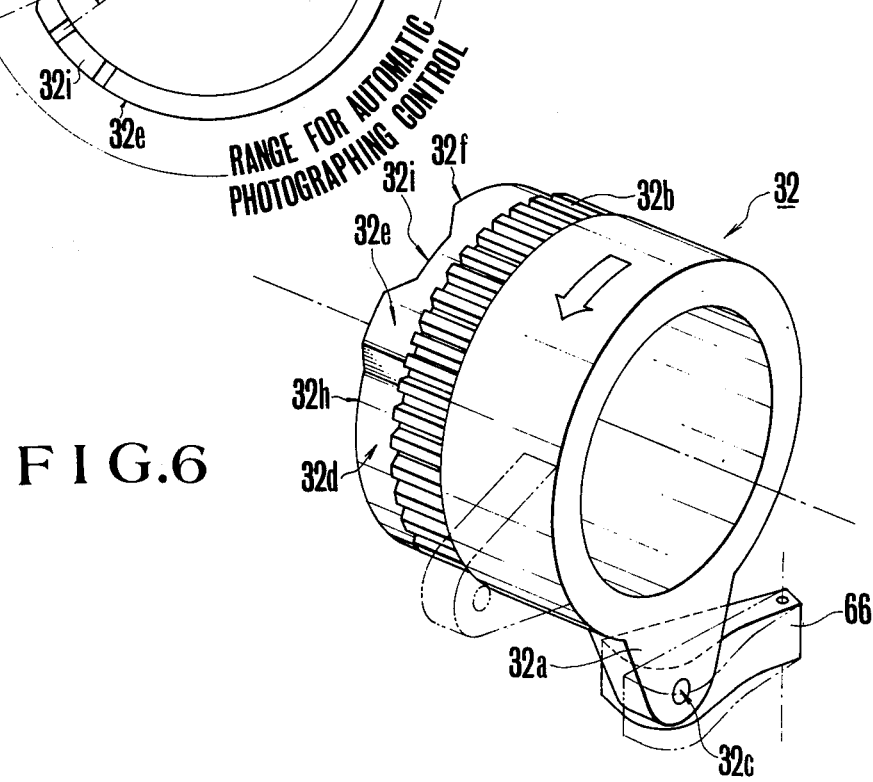
FIG. 6 is a schematic view of the control member useful in explaining it as being set for starting an automatic photographing operation.

The details of the relative positions of these cam portions 32d through 32i and 32d' are as shown in FIG. 5. The cam portion 32d controls the motor $M_1$ to restrict the range of zooming by this motor while the cam portions 32e and 32d' control the comtor $M_1$ to restrict the ranges of automatic photographing thereby.

The cam portion 32f controls the motor $M_2$ to restrict the range of ordinary photographing. The range restricted by the cam portion 32f corresponds to the above stated range restricted by the cam portion 32d.

The cam portions 32g, 32h and 32i control the motor $M_2$ to restrict the ranges of automatic photographing. The range restricted by the cam portions 32g and 32h corresponds to the above stated range restricted by the cam portion 32e while the range restricted by the cam portion 32i corresponds to the range restricted by the cam portion 32d'. More specifically stated, the time interval between setting for automatic photographing and the actual start of photographing, or the waiting time, is determined by the cam portion 32g while the actual photographing time is determined by the cam portion 32h.

The reference numeral 34 indicates a clutch member which serves to maintain coupling between the control member 32 and the zooming operation ring 28. The clutch member 34 is disposed at the protrusion 28a of the operation ring 28 and is provided with a connecting rod 34a which can be inserted in the hole 32c formed in the protrudent arm 32a of the control member 32. A spring 36 urges the clutch member 34 in the direction of causing the tip of the connecting rod 34a to come into the hole 32c.

In the camera body 10, there is provided the motor $M_1$ which drives the zoom lens system. The driving force of the motor $M_1$ is transmitted through gears 38, 40, 42 and 44 and through a friction spring 46 to a gear part 48 which engages with the cogged portion 32b. Accordingly, the operation ring 28 which is coupled to the control member 32 and to the protrudent arm 32a of the control member 32 rotates in the direction corresponding to the direction in which the motor $M_1$ rotates. There is also provided another motor $M_2$ which serves to drive the shutter device and the film feeding device. The driving force of the motor $M_2$ is transmitted through gears 50, 52 and 54 to a gear 56 which is unified into one body with a shutter blade arrangement 58 to cause the shutter blade to rotate in a known manner.

Figure 3:
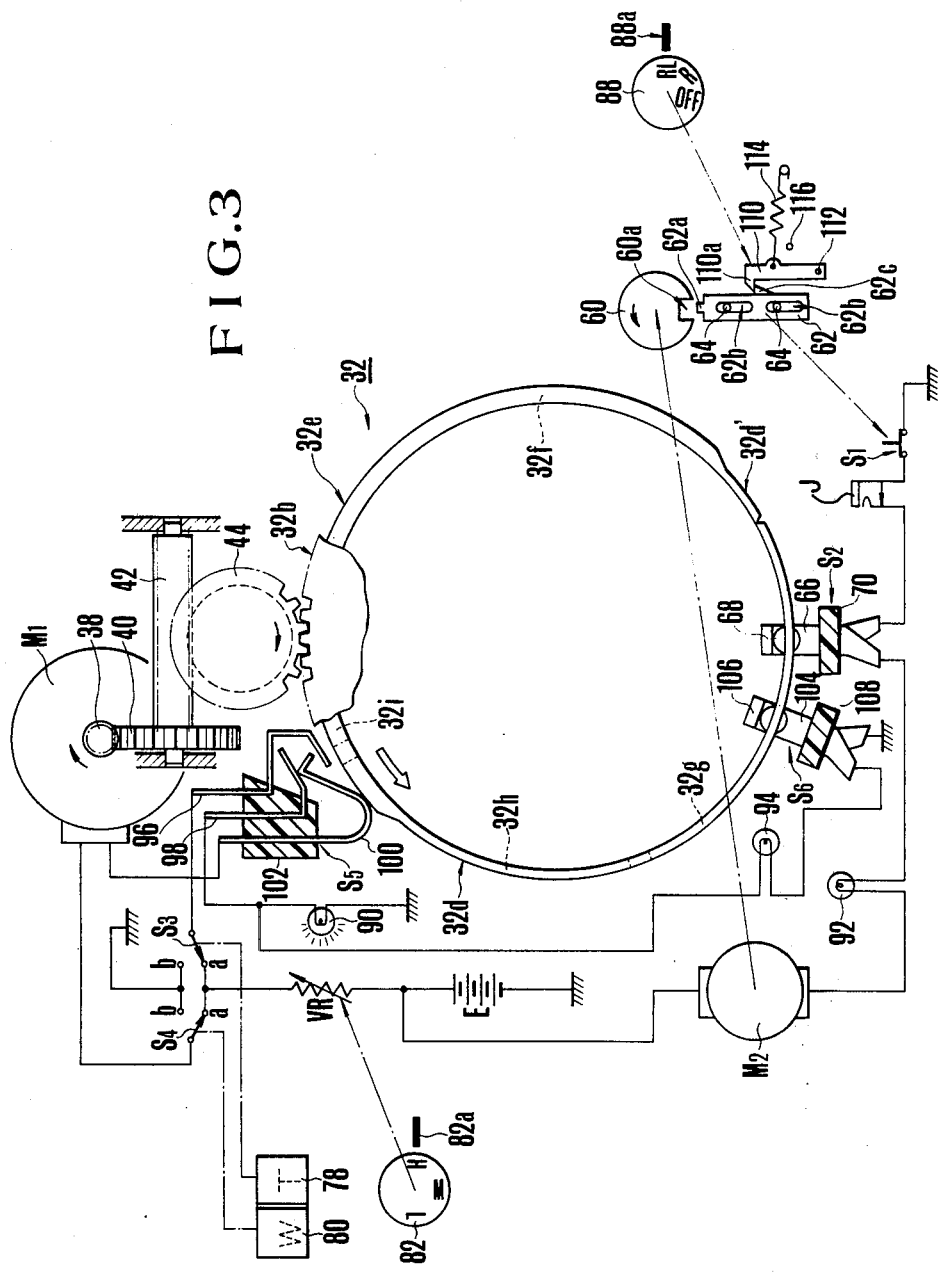
FIG. 3 is a schematic view illustrating the electric circuit construction of the camera shown in FIG. 1 and the operative relation of an electric driving device to the self-timer device, the camera being illustrated as in a state of starting an automatic photographing operation.
Figure 4:
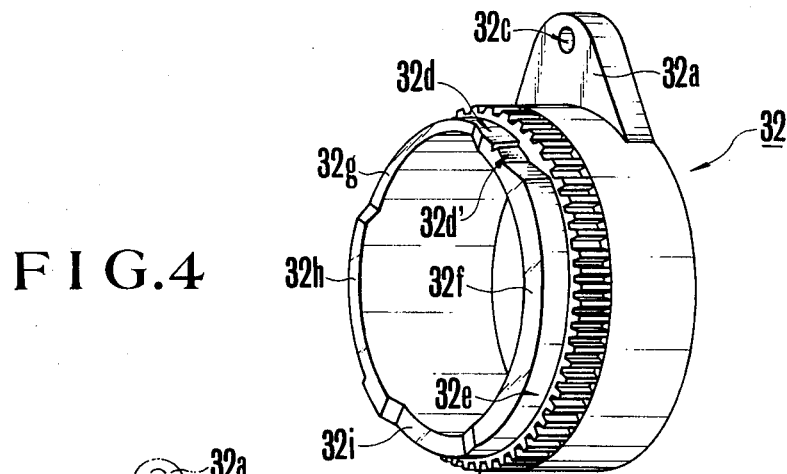
FIG. 4 is an oblique view of the exterior of the control member which is provided in the self-timer device for automatic photographing control.

The reference numeral 60 indicates a rotary disc which is provided with a notch 60a as shown in FIG. 3 and which is unified into one body with the shutter blade 58; 62 indicates a locking member which locks the shutter blade in its photographing aperture closing position. The locking member 62 is provided with a locking claw 62a which engages with the notch 60a of the rotary disc 60 when the shutter blade 58 is in the photographing aperture closing position. Pins 64 which engage with slits 62b are provided to permit sliding of the locking member in the vertical direction as shown in FIG. 2 and FIG. 3, so that the disc 60 can be unlocked by operating a release button 66.

The switch $S_1$ which is connected to the motor $M_2$ is turned on at the end of the sliding of the locking member when the locking member 62 unlocks the disc 60.

The switch $S_2$ which is provided for automatic photographing control is controlled to be closed and opened by the cam portions 32f through 32i of the control member 32. The switch $S_2$ comprises a moving contact piece 66 which makes sliding contact with the cam portions 32f through 32i and a fixed contact piece 68 and is connected in series with the switch $S_1$. The contact pieces 66 and 68 are carried by an insulating member 70.

The reference numeral 72 indicates a beam splitter having a semitransmission face 72a which divides the incoming light from an object into two; $R_2$ indicates a relay lens disposed behind the shutter blade 58; 74 indicates a film; $L_1$ and $L_2$ image forming lenses; and 76 a reflector. These components constitute a view finder optical system.

Referring to FIG. 1, the reference numeral 78 indicates an automatic zooming operation button which operates the zoom lens system 12 toward a tele-photographing end; 80 another automatic zooming operation button which operates the zoom lens system 12 toward a wide-angle photographing end; 82 a zooming speed adjusting operation dial which is provided with indication H (high speed), M (medium speed) and L (low speed) against an indication mark 82a; 84 an operation dial which is provided for adjustment of photographing speed (the number of frames to be photographed per minutes); 86 an operation dial which is provided for adjustment of the degree of an unillustrated photographing stop; and 88 another operation dial which is provided for selection of the camera releasing mode with indications OFF, R (run), RL (run lock), etc. arranged against an indicating mark 88a. A lamp 90 is provided to indicate that the self-timer device is in operation. A lamp 92 is provided to indicate that the camera is in pnotographic operation. Another lamp 94 is provided to indicate the start of the photographing operation with the self-timer device and also to warn the end of the photographing operation. These lamps are disposed on the front housing wall of the camera body 10.

The composition of the camera and particularly that of the electric circuit of the camera will be understood from the following description with reference to FIG. 3.

In FIG. 3, a variable resistor VR is provided in a power supply circuit connecting an electric power source E to the motor $M_1$. The resistance value of the variable resistor VR is arranged to vary with the setting of the operation dial 82. The switch $S_3$ is shifted by the operation button 78 from a terminal a to a terminal b, while the switch $S_4$ is shifted by the operation button 80 from its terminal a to its terminal b. The terminals a of these switches $S_3$ and $S_4$ are respectively connected to the plus side of the power source E while their terminals b are respectively connected to the minus side of the power source. A switch $S_5$ which is provided for zooming - automatic photographing control selection comprises a first fixed contact piece 96 connected to the above stated switch $S_3$; a second fixed contact piece 98 connected to the minus side of the power source E; and a movable contact piece 100 which is selectively brought into contact with the first and second contact pieces 96 and 98 by the cam portions 32d, 32d' and 32e of the above mentioned control member 32. When the movable contact piece 100 is in sliding contact with the cam portions 32d and 32d' of the control member 32, the contact piece 100 is in contact with the first fixed contact piece 96 and when it is in sliding contact with the cam portion 32e, it is in contact with the second fixed contact piece 98 as shown in FIG. 3.

With the movable contact piece 100 in contact with the first fixed contact piece 96, the motor $M_1$ responds to the shifting operation of switches $S_3$ and $S_4$ effected through the operation buttons 78 and 80. When the position of the switch $S_3$ is shifted from its terminal a to its terminal b with the operation button 78 operated, a power supply circuit is formed from the plus side of the power source E through the variable resistor VR, switch $S_4$, motor $M_1$, movable contact piece 100, first fixed contact piece 96 and switch $S_3$ to the minus side of the power source E. This causes the motor $M_1$ to rotate in the direction of arrow as shown in FIG. 3. Therefore, the control member 32 and the operation ring 28 coupled thereto rotate in the direction of arrow as shown in the drawing. Accordingly, the zoom lens system 12 is driven toward the tele-photographing end. When the button 80 is operated to shift the position of the switch $S_4$ from its terminal a to its terminal b, a power supply circuit is formed from the plus side of the power source E through the variable resistor VR, switch $S_3$, first fixed contact piece 96, movable contact piece 100, motor $M_1$ and switch $S_4$ to the minus side of the power source E and the motor $M_1$ rotates in the direction reverse to the arrow mark shown in the drawing. By this, the zoom lens system 12 is driven toward the wide-angle photographing end.

On the other hand, when the movable contact piece 100 is brought into contact with the second fixed contact piece 98, there is formed a power supply circuit from the plus side of the power source E to the minus side thereof through the variable resistor VR, switch $S_4$, motor $M_1$, movable contact piece 100, second fixed contact piece 98, and indication lamp 90. This causes the motor $M_1$ to rotate in the direction of arrow and the lamp 90 to light up. FIG. 3 represents this condition indicating the start of an automatic photographing operation.

Under this condition, the power supply to the motor $M_1$ remains unchanged even if the operation button 78 is operated to shift the position of the switch $S_3$. However, if the operation button 80 is operated to shift the position of the switch $S_4$ from its terminal a to its terminal b, the power supply to the motor $M_1$ is cut off and the motor $M_1$ comes to a stop.

These three contact pieces 96, 98 and 100 are carried by an insulating member 102. The lamp 90 is disposed between the minus side of the power source E and the second fixed contact piece 98. A switch $S_6$ is a warning lamp actuating switch which is arranged to be turned on and off by the cam portions 32f through 32i of the control member 32 a certain given time before the operation of the switch $S_2$ when the control member 32 rotates in the direction of arrow. The warning lamp actuating switch $S_6$ is provided with a fixed contact piece 106 and a movable contact piece 104 which comes into sliding contact with the cam portions 32f through 32i.

The warning lamp 94 is disposed between the second fixed contact piece 98 of the switch $S_5$ and the switch $S_6$. Accordingly, it lights up only when the switch $S_6$ is turned on with the switch $S_5$ having been shifted into an automatic photographing control position. The switch $S_2$ is turned on at a short time interval after the switch $S_6$ is turned on.

The photographing indication lamp 92 is disposed between the motor $M_2$ and the switch $S_2$ and is alight only when both of the switches $S_1$ and $S_2$ are turned on.

A locking member 110 is provided to lock the locking member 62 in a state of being disengaged from the disc 60. The locking member 110 is provided with a claw 110a which engages with the protrudent part 62c of the locking member 62. When the mode of the camera release is set at RL (run lock) at the operation dial 88, the locking member is simultaneously set in the position of locking the locking member 62 through an interlocking arrangement provided between the dial 88 and the locking member 110. The locking member 110 is provided with a rotary shaft 112, a spring 114 which is urging the member 110 to retreat from its locking position and a stopper pin 116.

The reference letter J indicates a jack receptacle which provides for connection to a remote controller.

The switches $S_2$ and $S_5$ are located in relation to the cam portions 32f through 32i in the following manner. When the cam portion 32d is acting on the switch $S_5$ (zooming range), the cam portion 32f is acting on the switch $S_2$. When the cam portions 32e and 32d' are acting on the switch $S_5$ (automatic photographing control range), the cam portions 32g through 32i are acting on the switch $S_2$, and, particularly when the cam portion 32d' is acting on the switch $S_5$, the cam portion 32i acts on the switch $S_2$. The cam portions 32f and 32h cause the switches $S_2$ and $S_6$ to turn on while the cam portions 32g and 32i cause the switches $S_2$ and $S_6$ to turn off.

The operations of the motion picture camera which is of the above described construction will be understood from the following description on (I) an ordinary photographing operation and (II) an automatic photographing operation accomplished with the self-timer device, taken in connection with the timing chart of FIG. 7.

I Ordinary Photographing Operation

In carrying out an ordinary photographing operation without using the self-timer device, the clutch member 34 is used to interconnect the operation ring 28 and the control member 32. Under this condition, the cam portion 32d of the control member 32 acts on the movable contact piece 100 of the selector switch $S_5$ thus causing the movable contact piece to be in contact with the first fixed contact piece 96 of the switch $S_5$. By this, there are formed a power supply circuit which permits the normal and reverse rotations of the motor $M_1$. On the other hand, since the cam portion 32f is acting on the movable contact pieces 66 and 104 of the switches $S_2$ and $S_6$, these switches are respectively caused to turn on thereby. Then the power supply to the indication lamps 90 and 94 which are connected to the second fixed contact piece 98 is shut off.

In the next place, the operation dial 88 is shifted from its "OFF" position to a desired mode of the camera release to obtain a condition under which the camera can be operated for photographing. When the release button 66 is operated under this condition, the button 66 is operated to disengage the locking member 62 from the disc 60. This enables the shutter blade 58 to rotate. Following this, when the release switch $S_1$ is turned on at the end of the sliding movement of the locking member 62, there is made a power supply circuit for the motor $M_2$ and the indication lamp 92. When the motor begins to rotate, the photographing begins and the lamp 92 lights up to indicate that a photographing operation is being made.

Under such conditions, when the automatic zooming operation buttons 78 or 80 is operated, a power supply circuit is made for the motor $M_1$ according as the switch $S_3$ or $S_4$ is shifted as described in the foregoing. The motor $M_1$ then begins to rotate in the direction determined according as the shifting of the switch $S_3$ or $S_4$. The zoom lens system 12 is then driven by the motor $M_1$ to effect a zooming operation.

With the operation dial 88 set in the RL (run lock) position, when the locking member 110 comes to its locking position in which it can lock the locking member 62 and when the switch $S_1$ is turned on with the release button 66 operated to disengage the locking member 62 from the disc 60, the locking member 62 is locked in that position. Accordingly, the photographing operation is automatically continued even when the operation of the release button 66 is discontinued. When the operation dial 88 is shifted from RL position to other positions, the spring 114 causes the locking member 110 to return to a position in which its locking engagement with the locking member 62 discontinues. This causes the locking member 62 to turn off the switch $S_1$, to stop the disc 60 and to stop the photographing operation.

The zooming operation also can be effected manually in the same manner as the automatic zooming operation by directly operating the operation ring 28 by hand.

II Automatic Photographing Operation with Self-Timer Device

For automatic photographing with the self-timer device, the clutch member 34 is pulled out against the force of the spring 36 in the direction of arrow, as shown in FIG. 2, to first disconnect the operation ring 28 from the control member 32. Since this makes the operation ring 28 disconnected from the motor, automatic zooming becomes no longer possible and zooming can be effected only by a manual operation.

Following the above, the operation dial 88 is set in the RL position. This brings the locking member 110 into a position in which the locking member 62 is locked by the locking member 110 as described in the foregoing. Under this condition, when the control member 32 is turned until its protrudent arm 32a comes to depress the release button 66, the locking member 62 is disengaged from the disc 60 by the depression of the button 66. Concurrently with this, the switch $S_1$ is turned on and, as shown in FIG. 3, the cam portion 32e comes to act on the switch $S_5$ to bring the movable contact piece 100 into contact with the second fixed contact piece 98. Then, cam portion 32g acts on switches $S_2$ and $S_6$ to turn them off.

With the switch $S_4$ shifted, a power supply circuit is formed from the plus side of the power source E, through the variable resistor VR, switch $S_4$, motor $M_1$, movable contact piece 100, the second fixed contact piece 98 and indication lamp 90, to the minus side of the power source E. This makes the motor $M_1$ begin to rotate in the direction or arrow as shown in FIG. 3. Concurrently with this, the lamp 90 lights up to indicate the commencement of the operation of the self-timer device.

The rotation of the motor $M_1$ in the direction of arrow as shown in FIG. 3 also causes the control member 32 to rotate in the direction of arrow as shown in FIG. 3. However, when a given length of time has elapsed after the start of the motor $M_1$, the cam portion 32h comes to act on the switch $S_6$. This makes the switch $S_6$ turn on and the indication lamp 94 light up to give a warning indication that a photographing operation is starting.

At some length of a time interval after the switch $S_6$ is turned on by the cam portion 32h, the cam portion 32h further comes to act on the switch $S_2$ to turn it on. With the switch $S_2$ thus having been closed, the indication lamp 92 lights up and, at the same time, the motor $M_2$ begins to rotate to start the photographing operation. Thus, the time $t_1$ between setting for automatic photographing and the closing of the switch $S_2$ by the cam portion 32h represents the aforementioned "waiting time."

When a preset length of time $t_2$ has passed after the closing of the switch $S_6$, the cam portion 32i comes to act on the switch $S_6$. The switch $S_6$ is opened by this. The indication lamp 94 is extinguished to give a warning indication that the photographing operation is coming to an end. When some more time has passed after the extinguishment of the lamp 94, the cam portion 32i further comes to act also on the switch $S_2$ to open it. The indication lamp 92 is then extinguished and, at the same time, the motor $M_2$ comes to a stop to end the photographing operation.

At the time when the switches $S_2$ and $S_6$ are caused to turn off (or open), the cam portion 32d' comes to act on the movable contact piece 100 of the switch $S_5$. This brings the movable contact piece 100 into contact with the first fixed contact piece 96. Accordingly, the power supply to the motor $M_1$ is cut off to stop the motor and the indication lamp 90 is extinguished.

The automatic photographing operation with the self-timer is carried out as described in the foregoing. In this particular embodiment, the point at which the switch $S_5$ comes into contact with the cam portions 32d and 32e is arranged to correspond to the tele-photographing end position of the zoom lens system 12 while the point at which the switch $S_5$ comes into contact with the cam portions 32d' and 32d is arranged to correspond to the wide-angle photographing end position of the zoom lens system 12. Furthermore, the time intervals of the waiting time $t_1$ and the photographing time $t_2$ are arranged to be adjustable by adjusting the resistance value of the variable resistor VR to change the rotating speed of the motor $M_1$.

As apparent from the foregoing, in the self-timer device of this invention, the driving force of the motor provided for driving the moving parts of a camera is utilized also for operating a control member which automatically controls the timing for starting and ending a photographing operation, so that a self-timer automatic photographing operation can be accomplished with a simplified arrangement which obviates the necessity for a special timer circuit or a complex timer mechanism. The self-timer device not only simplifies the construction of the camera with its simple arrangement but also accurately controls the required time intervals for automatic photographing operations.

We claim:

1. In a motion picture camera having a film feeding device, a shutter device, a first motor driving means which is provided for driving at least either the film feeding device or the shutter device, a zoom lens system and a second motor driving means which is provided for driving the zoom lens system; a self-timer device for automatic control of the photographing operation of the camera, comprising:

first switching means which is electrically coupled to said first motor driving means for controlling the starting and stopping of said first motor driving means;

second switching means which is electrically coupled to said second motor driving means for controlling the changing of the operation of the second motor driving means between a zooming operation and an automatic photographing control operation;

controlling means for controlling said first and second switching means, the controlling means having a first control portion for restricting said first motor driving means constantly to an operative condition, a second control portion for restricting the first motor driving means to an inoperative condition during a first predetermined period of time, a third control portion for restricting the first motor driving means to an operative condition during a second predetermined period of time, a fourth control portion for restricting said second motor driving means to the zooming operation, the fourth control portion corresponding to said first control portion, and a fifth control portion for restricting the second motor driving means to the automatic photographing control operation, the fifth control portion corresponding to the second and third control portions; the first switching means being operatively associated with said controlling means so as to be controlled by the first, second and third control portions of the controlling means; the second switching means being operatively associated with said controlling means so as to be controlled by the fourth and fifth control portions of the controlling means; and said controlling means being connected to said second motor driving means to be driven thereby in acting on said first and second switching means; and releasable connecting means for operatively connecting said zoom lens system with said second motor driving means, said connecting means being disposed between the zoom lens system and the second motor driving means and operable to release the operative connection therebetween for automatic photographing control.

2. A self-timer device according to claim 1, further including operation indicating means which is electrically coupled to said first switching means to indicate the operating condition of said first motor driving means, said indicating means being actuated by the first switching means when said first and third control portions of said controlling means act on the first switching means.

3. A self-timer device according to claim 1, further including operation shift indicating means for indicating the change of the operation of the second motor driving means, said indicating means being electrically coupled to said second switching means so as to be actuated thereby for indicating the change of the operation of the second motor driving means when the fifth control portion of said controlling means acts on said second switching means.

4. A self-timer according to claim 1, further including warning means electrically coupled to said second switching means to give a warning indication of the operating condition of said first motor driving means at the time of the automatic photographing operation, and third switching means electrically coupled to said warning means to actuate said warning means, the third switching means being operatively associated with said controlling means to be operated by the third control portion thereof to actuate said warning means a preset period of time before the start of the first motor driving means at the time of the automatic photographic operation.

5. A self-timer device according to claim 1, further comprising:

adjusting means for adjusting said first and second predetermined periods of time, each of which being determined respectively by said second and third control portions of said controlling means, said adjusting means being manually operable from outside the camera and electrically connected to said second motor driving means so as to adjust the first and second predetermined periods of time by adjusting the operating speed of the second motor driving means, thus enabling automatic photographing with different periods of time.

6. A motion picture camera comprising:

first motor means to drive said camera for photographing;

a zoom lens system;

second motor means adapted to drive said zoom lens system;

control circuit means for controlling the operation of said second motor means, said circuit means being electrically coupled to the second motor means and operable to change the operation of the second motor means between a first operating state for effecting zooming and a second operating state for effecting automatic photographing control;

releasable connecting means for operatively connecting said zoom lens system with said second motor means, said connecting means being disposed between the zoom lens system and the second motor means, and operable to release the operative connection therebetween for automatic photographing control;

switch means for controlling the starting and stopping of said first motor means at the time of the automatic photographing operation, said switch means being electrically coupled to the first motor means;

controlling means for controlling the automatic photographing operation of the camera, said controlling means being operatively connected with said second motor means so as to be driven by the same for automatic photographing control and having:

a first control portion for restricting said first motor means to an inoperative state during a first predetermined period of time, and a second control portion for restricting said first motor means to an operative state during a second predetermined period of time;

said switch means being operatively associated with said controlling means so as to be controlled by said first and second control portions of the controlling means in such a manner that said first motor means is restricted to the inoperative state during said first predetermined period of time determined by the first control portion, and, thereafer, the first motor means is set to the operative state during said second predetermined period of time determined by the second control portion at the time of automatic photographing.

7. A motion picture camera according to claim 6, in which said control circuit means includes a change-over switch for changing the operation of said second motor means between said first and second operating states, said change-over switch being electrically coupled to the motor means.

8. A motion picture camera according to claim 7, further including indicating means for indicating the change of the operation of said second motor means, said indicating means being electrically coupled to said change-over switch so as to be actuated by the same for indicating the change of the operation of the second motor means.

9. A motion picture camera according to claim 7, further including manually operable switch means for controlling the operation of said second motor means at its first operating state for zooming, said operable switch means being electrically coupled to said change-over switch and adapted to having its controlling operation of the second motor means nullified by the change-over switch when the change-over switch sets the second motor means to its second operating state for automatic photographing control.

10. A motion picture camera according to claim 7, in which said controlling means further includes:

a third control portion for restricting said second motor means to its first operating state, and a fourth control portion for restricting said second motor means to its second operating state, said fourth control portion corresponding to said first and second control portions said change-over switch being operatively associated with said controlling means so as to be controlled by said third and fourth control portions of the controlling means in such a manner that the second motor means is set to its first operating state when the third control portion acting on the switch and the second motor means is set to its second state when the fourth control portion acting on the switch.

11. A motion picture camera according to claim 10, in which said controlling means further includes a fifth control portion for restricting said first motor means constantly to its operative state for ordinary photographing, said fifth control portion corresponding to said third control portion, said switch means being arranged to be operatively associated with said fifth control portion so as to set the first motor means constantly to its operative state for ordinary photographing when the fifth control portion acts on the switch means.

12. A motion picture camera according to claim 11, further including a trigger switch for triggering said first motor means, said trigger switch being electrically connected to the first motor means and manually operable from outside the camera, said switch means being electrically coupled to said trigger switch for controlling the first motor means.

13. A motion picture camera according to claim 6, further including:

indicating means for indicating the operating state of the first motor means, said indicating means being electrically connected to said switch means so as to be actuated by the same when the second control portion acts on the switch means and disposed at a position at which the indicating state of the indicating means is visible from outside the camera.

14. A motion picture camera according to claim 6, further including
  warning means to give a warning indication as to the operating state of said first motor means at the time of the automatic photographing operation, said warning means being disposed at a position at which the indicating state is visible from outside the camera, and
  an actuating switch for actuating said warning means, said actuating switch being electrically coupled to the warning means and operatively associated with said controlling means so as to be operated by said second control portion thereof to actuate the warning means a preset period of time before the start of the first motor means at the time of the automatic photographing operation.

15. A motion picture camera according to claim 6, further including
  adjusting means for adjusting said first and second predetermined periods of time each of which being determined respectively by said first and second control portions of said controlling means, said adjusting means being manually operable from outside the camera and electrically connected to said second motor means so as to adjust the first and second predetermined periods of time by adjusting the operating speed of the second motor means, so as to permit automatic photographing with different periods of time.

* * * * *